(12) United States Patent
Xu et al.

(10) Patent No.: US 10,860,493 B2
(45) Date of Patent: Dec. 8, 2020

(54) METHOD AND APPARATUS FOR DATA STORAGE SYSTEM

(71) Applicant: EMC IP Holding Company LLC, Hopkinton, MA (US)

(72) Inventors: Xinlei Xu, Beijing (CN); Liam Xiongcheng Li, Beijing (CN); Jian Gao, Beijing (CN); Lifeng Yang, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/268,807

(22) Filed: Sep. 19, 2016

(65) Prior Publication Data

US 2017/0083447 A1 Mar. 23, 2017

(30) Foreign Application Priority Data

Sep. 22, 2015 (CN) .......................... 2015 1 0608751

(51) Int. Cl.
*G06F 12/00* (2006.01)
*G06F 12/08* (2016.01)
*G06F 13/00* (2006.01)
*G06F 12/0888* (2016.01)
*G06F 13/10* (2006.01)
*G06F 12/123* (2016.01)
*G06F 12/0868* (2016.01)

(52) U.S. Cl.
CPC ...... *G06F 12/0888* (2013.01); *G06F 12/0868* (2013.01); *G06F 12/123* (2013.01); *G06F 13/102* (2013.01); *G06F 2212/1016* (2013.01); *G06F 2212/222* (2013.01)

(58) Field of Classification Search
CPC .............. G06F 12/1027; G06F 12/12; G06F 2212/225; G06F 2212/401; G06F 11/3409
USPC .......................................... 711/135
See application file for complete search history.

(56) References Cited

U.S. PATENT DOCUMENTS

| 9,037,792 | B1 * | 5/2015 | Ingle | G06F 12/0866 |
| | | | | 711/113 |
| 9,208,086 | B1 * | 12/2015 | Shalev | G06F 12/0871 |
| 9,804,973 | B1 * | 10/2017 | Shalev | G06F 12/126 |
| 2007/0192545 | A1 * | 8/2007 | Gara | G06F 9/3842 |
| | | | | 711/141 |
| 2011/0093905 | A1 * | 4/2011 | McKinley | H04N 21/23106 |
| | | | | 725/92 |

(Continued)

FOREIGN PATENT DOCUMENTS

CN 101907978 A 12/2010

*Primary Examiner* — Mohamed M Gebril
(74) *Attorney, Agent, or Firm* — Krishnendu Gupta; Lesley Leonessa

(57) ABSTRACT

A method and an apparatus for data storage system are provided. The method comprises: receiving an I/O request from an upper layer, the I/O request including an I/O type identifier; determining an I/O type of the I/O request based on the I/O type identifier; and processing the I/O request based on the determined I/O type. The present disclosure also provides a corresponding apparatus. The method and the apparatus according to the present disclosure can determine a storage policy of corresponding data based on different I/O types to improve the overall system performance.

20 Claims, 10 Drawing Sheets

(56) References Cited

U.S. PATENT DOCUMENTS

| | | | |
|---|---|---|---|
| 2011/0153893 A1* | 6/2011 | Foong | G06F 9/4812 710/268 |
| 2012/0137059 A1* | 5/2012 | Yang | G06F 3/068 711/104 |
| 2012/0159474 A1* | 6/2012 | Chakhaiyar | G06F 3/0659 718/1 |
| 2012/0290786 A1* | 11/2012 | Mesnier | G06F 12/0875 711/113 |
| 2013/0346723 A1* | 12/2013 | Kawamura | G06F 3/067 711/170 |
| 2014/0068183 A1* | 3/2014 | Joshi | G06F 3/0662 711/114 |
| 2014/0310473 A1* | 10/2014 | Bilas | G06F 11/00 711/129 |
| 2015/0010143 A1* | 1/2015 | Yang | H04L 9/3249 380/28 |
| 2015/0095567 A1* | 4/2015 | Noda | G06F 11/3034 711/113 |
| 2015/0278090 A1* | 10/2015 | Hu | G06F 3/0688 711/118 |
| 2016/0048551 A1* | 2/2016 | Baldwin | H04L 67/2847 707/756 |

\* cited by examiner

METHOD AND APPARATUS FOR DATA STORAGE SYSTEM

RELATED APPLICATION

This application claim priority from Chinese Patent Application Number CN201510608751.6, filed on Sep. 22, 2015 at the State Intellectual Property Office, China, titled "METHOD AND APPARATUS FOR DATA STORAGE SYSTEM," the contents of which is herein incorporated by reference in its entirety.

FIELD

Embodiments of the present disclosure relate to a data storage system, and more specifically, relates to a fast cache.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A brief summary of each embodiment is given hereinafter to provide basic understandings on some aspects of each embodiment. The summary does not intend to identify the gist of key elements or describe scope of each embodiment, but solely aims to exhibit some concepts in a simplified manner and serve as a prelude of the more detailed description.

The first aspect of the present disclosure provides a method for input/output (I/O) processing in a storage system, comprising: receiving an I/O request from an upper layer, the I/O request including an I/O type identifier; determining an I/O type of the I/O request based on the I/O type identifier; and processing the I/O request based on the determined I/O type.

Though particular embodiments are illustrated in an example manner in the figures, it should be understood that the embodiments herein do not intend to limit embodiments as the specific presentation of the present disclosure.

BRIEF DESCRIPTION OF THE ACCOMPANYING DRAWINGS

The objectives, advantages and other features will become more obvious in the following disclosed contents and claims. Just for illustrative purpose, non-limiting descriptions for some embodiments are provided herein with reference to figures, in which:

FIG. 1 schematically illustrates disk allocation and mapping;

DETAILED DESCRIPTION OF THE EMBODIMENTS

Hereinafter, details are expounded for purpose of illustration. However, it will be appreciated by those skilled in the art that embodiments of the present disclosure can be realized without presence of these specific details. Therefore, the present disclosure is not intended to be limited to the illustrated embodiments; instead, it is granted a broadest scope consistent with the principles and features described herein.

It should be understood that terms "first" and "second" are only used for distinguishing one element from another. In actuality, a first element can also be referred to as a second element; vice versa. In addition, it should also be understood that terms of "comprise" and "include" are only used to state existence of the features, elements, functions or components as stated, but do not exclude existence of one or more other features, elements, functions or components.

For ease of explanation, the embodiments of the present disclosure will be described herein with SSD as an example of the fast cache. However, as those skilled in the art may understand, the embodiments of the present disclosure are not limited to only using the SSD as the fast cache.

Typically, in a storage system, a physical storage allocation includes a logical identifier. For example, conventionally, a logical unit number (LUN) may be used as a unique identifier for the physical storage allocation. Traditionally, a LUN is a representation of a storage area, which could reference an entire set of redundant arrays of independent disks (RAID), a single hard disk or partition, or multiple disks or partitions.

Generally, a solid state disk (SSD) cache is a storage system component which improves performance by transparently storing data in a solid state storage disk medium. SSD has a much higher performance than a hard drive disk (HDD). In the VNX series products of EMCTM, the SSD cache is also called a fast cache.

Figure 1:
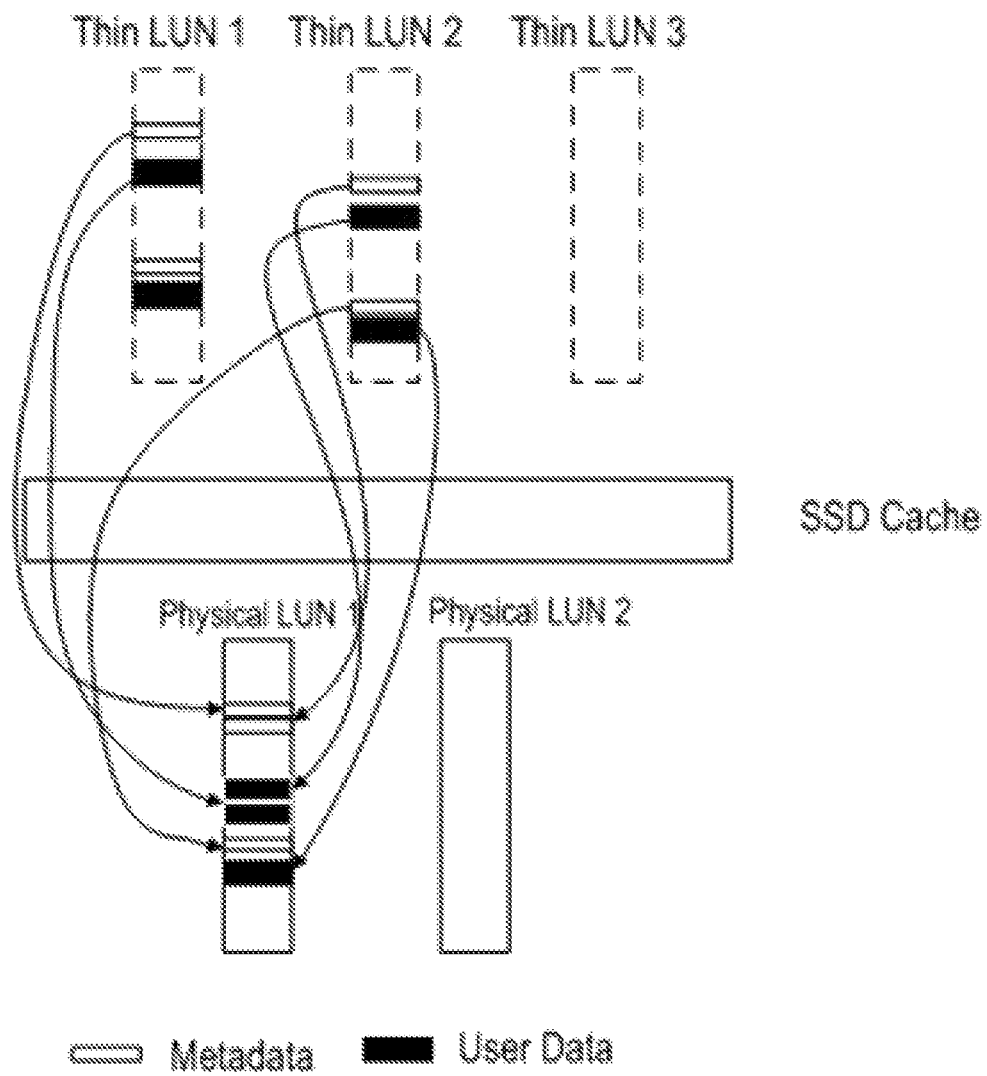

Typically, from the perspective of the SSD cache, only the LUN information is visible, such as the logical unit number, the starting address, the area size, etc., but the information on usage of the input/output (I/O) is invisible. FIG. 1 schematically illustrates a diagram of disk distribution and mapping. As shown in FIG. 1, the thin LUN 1 and the thin LUN 2 are mapped to the physical LUN 1. The thin LUN therein is also called a virtual LUN. In the example of FIG. 1, the two virtual LUNSs respectively store some user data and metadata, and these data are mapped to the physical LUN1. In the example of FIG. 1, the I/O sent from an engine (or called a drive) of the virtual LUN is processed by the SSD cache and then forwarded to the HDD.

The first aspect of the present disclosure provides a method for input/output (I/O) processing in a storage system, comprising: receiving an I/O request from an upper layer, the I/O request including an I/O type identifier; determining an I/O type of the I/O request based on the I/O type identifier; and processing the I/O request based on the determined I/O type.

In one embodiment, determining an I/O type of the I/O request based on the I/O type identifier may comprise: determining an I/O type from a predetermined set of I/O types based on the I/O type identifier, the predetermined set of I/O types including a first I/O type and a second I/O type; and the storage system includes a first storage device adapted to fast cache data of I/O of the first I/O type and a second storage device adapted to fast cache data of I/O of the second I/O type.

In another one embodiment, the first I/O type may include a random I/O and the second I/O type may include a continuous I/O. In a further embodiment, the first I/O type may include a metadata I/O and the second I/O type may include a user data I/O and/or a background data I/O.

In one embodiment, the first storage device may include a fast cache and the second storage device include a hard drive (HDD).

In another one embodiment, processing the I/O request based on the determined I/O type may comprise: forwarding the I/O request to an backend to read/write data and sending a response to the upper layer if the I/O request is returned from the backend, and determining based on the determined I/O type whether the read/write data responding to the I/O request is to be promoted to the fast cache.

In one further embodiment, determining based on the determined I/O type whether the read/write data responding to the I/O request is to be promoted to the fast cache, may comprise: if the determined I/O type is a random I/O or a metadata I/O, promoting the read/write data responding to the I/O request to the fast cache.

In another one embodiment, determining based on the determined I/O type whether the read/write data responding to the I/O request is to be promoted to the fast cache, may comprise: if the determined I/O type is a continuous I/O, a user data I/O or a background data I/O, determining further based on recency and/or frequency of the I/O request whether the read/write data of the I/O request is to be promoted to the fast cache.

In one embodiment, the method may further comprise: prior to forwarding the I/O request to the backend, checking whether data to be read/written by the I/O request has been cached in the fast cache, and if the data to be read/written by the I/O request has been cached in the fast cache, forwarding the I/O request to the fast cache to read/write data and sending a request to the upper layer, and if the data to be read/written by the I/O request has not been cached in the fast cache, forwarding the I/O request to the backend only.

In another one embodiment, the upper layer may be a dynamic random access memory (DRAM) drive or a virtual logic unit number (LUN) drive.

In one further embodiment, processing the I/O request based on the determined I/O type may comprise: obtaining, from a set of cache promotion policies, a cache promotion policy for the determined I/O type; and determining based on the obtained cache promotion policy whether data to be read/written by the I/O request is to be promoted to a fast cache. In another one embodiment, the set of cache promotion policies may comprise at least one of the following: for a metadata I/O, metadata is promoted to the fast cache if the metadata is firstly accessed; for a user data I/O, user data is promoted to the fast cache if a number of times for which the user data is accessed exceeds a first promotion threshold; for a background data I/O, background data is promoted to the fast cache if a number of times for which the background data is accessed exceeds a second promotion threshold; for an I/O having a read/write data amount exceeding a predetermined data amount threshold, read/write data is not to be promoted to the fast cache.

In one embodiment, the method may further comprise: configuring the set of cache promotion policies through at least one of a configuration file, a command line tool and a driver interface.

In another one embodiment, processing the I/O request based on the determined I/O type may comprise: if the read/write data responding to the I/O request has been cached in the fast cache, determining based on the determined I/O type whether read/write data responding to the I/O request is to be cleared from a fast cache.

In one embodiment, determining based on the determined I/O type whether read/write data responding to the I/O request is to be cleared from the fast cache, may comprise: determining, from a set of cache clearing policies, a cache clearing policy for the determined I/O type; and determining based on the determined cache clearing policy whether read/write data responding to the I/O request is to be cleared from the fast cache.

In another one embodiment, the method may further comprise: configuring the set of cache clearing policies, such that: metadata is retained in the fast cache without being cleared in a first probability; user data is retained in the fast cache without being cleared in a second probability less than the first probability; and background data is retained in the fast cache without being cleared in a third probability not greater than the second probability.

In one further embodiment, the method may further comprise: configuring the set of cache clearing policies through at least one of a configuration file, a command line tool and a driver interface.

In another one embodiment, the method may further comprise: managing data pages cached in the fast cache through a least recently used (LRU) list, wherein the LRU list including hottest data pages at a first item and coldest data pages at a last item, and determining based on the determined I/O type whether read/write data responding to I/O request is cleared from the fast cache, may comprise: if the determined I/O type is a metadata I/O and if a number of times for which the metadata pages reach the last item of the LRU list exceeds a first clearing threshold, clearing corresponding metadata pages from the fast cache; if the determined I/O type is a user data I/O or a background data I/O and if a number of times for which the user data pages or background data pages reach the last item of the LRU list exceeds a second clearing threshold, clearing corresponding user data pages or background data pages from the fast cache; wherein the second clearing threshold is less than the first clearing threshold.

The second aspect of the present disclosure provides an apparatus for input/output (I/O) processing in a storage system, comprising: a receiving unit configured to receive an I/O request from an upper layer, wherein the I/O request includes an I/O type identifier; a type determining unit configured to determine an I/O type of the I/O request based on the I/O type identifier; and a processing unit configured to process the I/O request based on the determined I/O type.

In one embodiment, the type determining unit may be configured to: determine a first I/O type from a predetermined set of I/O types based on the I/O type identifier; wherein the predetermined set of I/O types includes a first I/O type and a second I/O type; and wherein the storage system includes a first storage device adapted to fast cache data of the I/O of the first I/O type and a second storage device adapted to store data of the I/O of the second I/O type.

In another one embodiment, the first I/O type may include a random I/O and the second I/O type includes a continuous I/O. In one further embodiment, the first I/O type may include a metadata I/O and the second I/O type may include a user data I/O and/or a background data I/O.

In one further embodiment, the first storage device may include a fast cache and the second storage device may include a hard disk drive (HDD).

In one embodiment, the processing unit may further include: a forwarding unit configured to forward the I/O request to an backend to read/write data; and a promoting unit configured to send a response to the upper layer if the I/O request is returned from an backend, and to determine based on the determined I/O type whether read/write data responding to the I/O request is to be promoted to the fast cache.

In another one embodiment, the promoting unit may be configured to: promote the read/write data responding to the I/O request to the fast cache if the determined I/O type is a random I/O or a metadata I/O.

In one further embodiment, the promoting unit may be configured as: determining whether the read/write data responding to the I/O request is to be promoted to the fast cache further based on recency and/or frequency of the I/O request, if the determined I/O type is a continuous I/O, a user data I/O or a background data I/O.

In one embodiment, the apparatus may further comprise: a checking unit for checking whether data to be read/written by the I/O request has been cached in the fast cache prior to forwarding the I/O request to the backend, and the forwarding unit may be configured to: forward the I/O request to the fast cache to read/write data and send a response to the upper layer, if the data to be read/written by the I/O request has been cached in the fast cache, and forward the I/O request to the backend only if the data to be read/written by the I/O request has not been cached in the fast cache yet.

In another one embodiment, the upper layer may be a dynamic random access memory (DRAM) drive or a virtual logic unit number (LUN) drive.

In one embodiment, the processing unit in the apparatus may further comprise: a promotion policy determining unit configured to obtain from a set of cache promotion policies a cache promotion policy for the determined I/O type; and a promoting unit configured to determine based on the obtained cache promotion policy whether data to be read/written by the I/O request is promoted to a fast cache.

In one embodiment, the set of cache promotion policies may include at least one of the following: for a metadata I/O, metadata is promoted to the fast cache if the metadata is firstly accessed; for a user data I/O, user data is promoted to the fast cache if a number of times for which the user data is accessed exceeds a first promotion threshold; for a background data I/O, background data is promoted to the fast cache if a number of times for which the background data is accessed exceeds a second promotion threshold; for an I/O which has a read/write data amount exceeding a predetermined data amount threshold, read/write data is not to be promoted to the fast cache.

In another one embodiment, the apparatus may further comprise: a promotion policy configuring unit configured to configure the set of cache promotion policies through at least one of a configuration file, a command line tool and a driver interface.

In one embodiment, the processing unit in the apparatus may be configured to: determine based on the determined I/O type whether read/write data responding to the I/O request is to be cleared from a fast cache if read/write data responding to the I/O request has been cached in the fast cache.

In another one embodiment, the processing unit may further comprise: a clearing policy determining unit configured to determine from a set of cache clearing policies a cache clearing policy for the determined I/O type; and a clearing unit configured to determine based on the determined cache clearing policy whether the read/write data responding to the I/O request is cleared from the fast cache.

In one embodiment, the apparatus may further comprise: a clearing policy configuring unit configured to configure the set of cache clearing policies, such that: metadata is retained in the fast cache without being cleared in a first probability; user data is retained in the fast cache without being cleared in a second probability less than the first probability; and background data is retained in the fast cache without being cleared in a third probability not greater than the second probability.

In another one embodiment, the apparatus may further comprise: a clearing policy configuring unit configured to configure the set of cache clearing policies through at least one of a configuration file, a command line tool and a driver interface.

In one embodiment, the apparatus may further comprise: a cache data managing unit configured to manage data pages cached in the fast cache through a least recently used (LRU) list, the LRU list including hottest data pages at a first item and coldest data pages at a last item, and the clearing unit is configured to: determine based on the determined I/O type whether read/write data responding to I/O request is to be cleared from the fast cache, comprising: clearing corresponding metadata pages from the fast cache if the determined I/O type is a metadata I/O and if a number of times for which the metadata pages reach the last item of the LRU list exceeds a first clearing threshold; clearing corresponding user data pages or background data pages from the fast cache if the determined I/O type is a user data I/O or a background data I/O and if a number of times for which the user data pages or background data pages reach the last item of the LRU list exceeds a second clearing threshold; wherein the second clearing threshold is less than the first clearing threshold.

The third aspect of the present disclosure provides a fast cache in a storage system, comprising the apparatus according to the second aspect of the present disclosure.

The method and the device according to the present disclosure can determine the storage policy of the corresponding data based on different I/O types to improve the overall system performance According to some embodiments, small random I/Os are prevented from being sent to HDD. According to some other embodiments, the metadata can be retained in the cache for a longer time than the user data.

Though particular embodiments are illustrated in an example manner in the figures, it should be understood that the embodiments herein do not intend to limit embodiments as the specific presentation of the present disclosure.

FIG. 1 schematically illustrates disk allocation and mapping. As shown in FIG. 1, user data and metadata in the virtual LUN1 and the virtual LUN2 are all mapped to a physical LUN1. The physical LUN1 herein represents a storage area in a HDD. In FIG. 1, either an I/O request on the metadata or an I/O request on the user data may be forwarded from the SSD drive to the HDD. The two types of I/Os have different characteristics. The metadata I/O is conventionally small and random, whereas the user data I/O is usually continuous and has a greater data amount than the metadata I/O does. If the small and random I/O (for example, the metadata I/O) is forwarded to the HDD, the performance of the HDD will be severely affected, because the HDD is adapted to process reading and writing of sequential bulk data but has a poor performance if processing small and random I/Os. For instance, a HDD can provide a throughput of 100 M/s for sequential data reading and writing, but may provide only a throughput of several M for the small and random I/Os. Unlike it, a SDD is capable of processing small and random I/Os well.

In the present embodiment of the I/O processing, as shown in FIG. 1, the SSD cache is not aware of a type of an I/O from an upper layer, and therefore the SSD applies a same processing rule to all I/Os. The processing rule does not make any optimization for the metadata I/O, the user data I/O and the background data I/O (for example, dynamic random access memory (DRAM) cache background I/O). Thereupon, more small and random I/Os are forwarded to a HDD, and the overall performance of the system is reduced.

The inventor of the present disclosure proposes that, if a fast cache (such as a SSD) learns the I/O type and determines cache and storage policies of corresponding data based on the I/O type, the overall performance of the storage system will be improved. For instance, more data pages of the small and random I/Os are cached in the SSD, and relatively fewer missed random I/Os are forwarded to HDD. In other words, if the fast cache is used to cache more small and random access pages, it is advantageous to the overall system performance. Therefore, the present disclosure proposes an I/O processing method and apparatus which makes use of the I/O type.

Figure 2A:
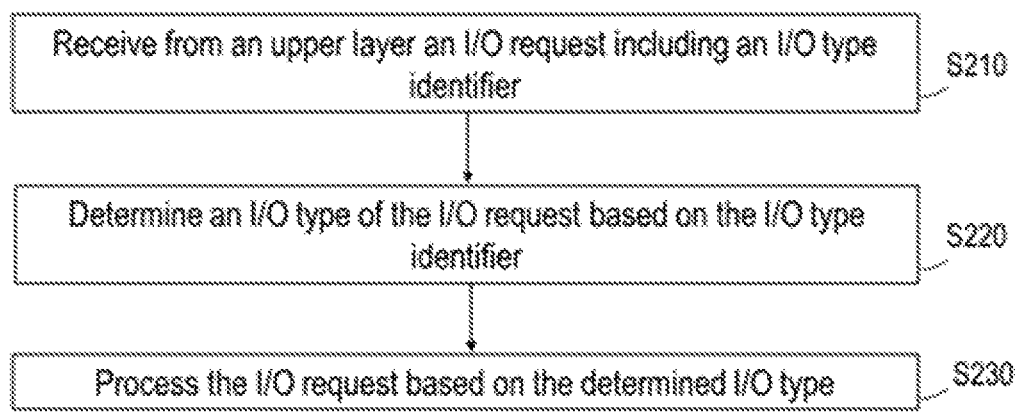
FIGS. 2a-2b illustrates a flow chart of the example method for I/O processing in a storage system according to embodiments of the present disclosure.

Now referring to FIG. 2a, a method 200 for I/O processing in the storage system according to embodiments of the present disclosure is illustrated. The method may be implemented in the SSD cache as shown in FIG. 1, but embodiments of the present disclosure are not limited thereto. For instance, the method may be implemented by another apparatus, apart from the SSD.

As shown in FIG. 2a, the method 200 comprises receiving an I/O request from an upper layer at a block S210, wherein the I/O request includes an I/O type identifier; determining an I/O type of the I/O request based on the I/O type identifier at a block S220; and processing the I/O request based on the determined I/O type at a block S230. The method 200 enables selecting an efficient I/O processing policy based on the I/O type, thereby improving the performance of the system.

In one embodiment, at the block S210, the I/O request is received from a dynamic random access memory (DRAM) drive or a thin LUN (the virtual LUN) drive as shown in FIG. 1. As appreciated by those skilled in the art, in other embodiments, the method 200 may receive the I/O request from other upper layers according to different structure of data paths.

As described above with reference to FIG. 1, the I/O type may include but not limited to the metadata I/O, the user data I/O, the background data I/O, etc. The metadata I/O is usually small and random, whereas the user data I/O is usually a big and continuous I/O. In addition, certain I/Os may involve a bulk continuous I/O, such as a video stream, and such I/O does not need a SSD cache to cache the data pages because the HDD is capable of processing I/Os of this type with rather good performance. Accordingly, by the I/O characteristics, the I/O may be classified into, for example, but not limited to, a random I/O, a continuous I/O, etc.; or into a small data amount I/O, a medium data amount I/O, a large data amount I/O, etc.

In one embodiment of the present disclosure, these I/O types may be included in one predetermined set of I/O types, and at the block S220, one I/O type can be determined from the predetermined set of I/O types based on the I/O type identifier.

According to one embodiment of the present disclosure, the I/O type identifier may be one field in the I/O request structure. For example, the I/O request received from the upper layer at the block S210 may include the I/O structure shown below, wherein the I/O type identifier_io_type_types is added:

```
typedef enum
{
    IO_TYPE_METADATA = 0,
    IO_TYPE_CACHE_FLUSH_DATA,
    IO_TYPE_USERDATA,
    ...,
}_io_type_;
struct I/Os {
...;
_to_type_types;
...
};
```

In the example, the predetermined set of I/O types includes the metadata (IO_TYPE_METADAT), the cache clearing data (IO_TYPE_CACHE_FLUSH_DATA), the user data (IO_TYPE_USERDATA), and other types not shown ( . . . ). The cache clearing data may be considered as an example of the background data I/O. According to a particular value of the I/O type identifier in the received I/O request (_io_type_types in the example), the I/O types can be determined at the block S220.

In one embodiment of the present disclosure, the predetermined set of I/O types may include at least a first I/O type and a second I/O type; and the storage system may include a first storage device and a second storage device; wherein the first storage device is adapted to fast cache data of I/O of the first I/O type, and the second storage device is adapted to store data of I/O of the second I/O type. For example, the first I/O type may include the random I/O, and the second I/O type may include the continuous I/O. Alternatively, the first I/O type may include the metadata I/O, and the second I/O type may include the user data I/O and/or the background data I/O. In another example, the first storage device may include a fast cache, and the second storage device may include a hard disk drive (HDD). As an example, the fast cache may be a SSD cache, but the embodiments of the present disclosure are not limited to this.

Figure 2B:
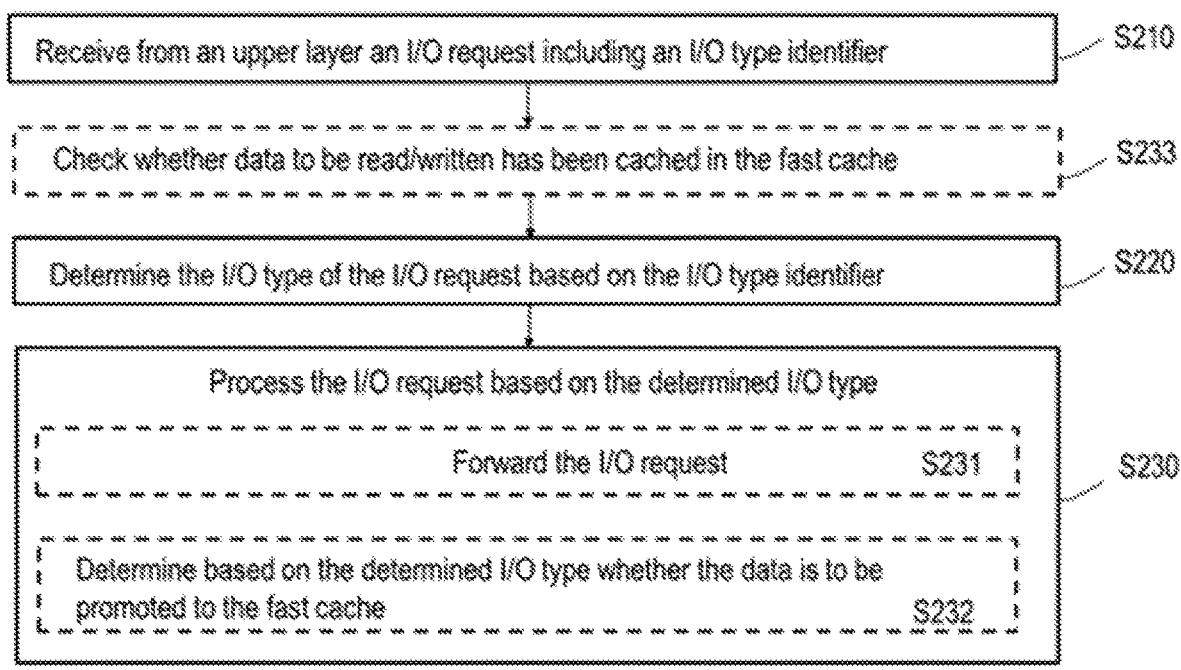

FIG. 2b illustrates a flowchart of operation in the block S230 according to one embodiment of the present disclosure. As shown in FIG. 2b, in the present embodiment, processing at the block S230 may comprise forwarding the I/O request to a backend to read/write data (S231), sending a response to the upper layer if the I/O request is returned from the backend, and determining whether the read/write data responding to the I/O request is to be promoted to the fast cache (S232) based on the I/O type determined at the block S220. This embodiment makes it possible to promote corresponding data to the cache selectively for an I/O type, thereby avoiding processing all I/Os through the HDD, particularly the I/Os that may reduce the HDD performance.

As an example, if the I/O type determined at the block S220 is the random I/O or the metadata I/O, the read/write data responding to the I/O request may be promoted to the fast cache (i.e., write into the fast cache) at the block S230 (or S232). In another one example, if the determined I/O type is a continuous I/O, the user data I/O or the background data I/O, the read/write data responding to the I/O request may not be promoted to the fast cache. In another embodiment, if the determined I/O type is the continuous I/O, the user data I/O or the background data I/O, it may be determined whether the read/write data responding to the I/O request is to be promoted to the fast cache further based on recency and/or frequency of the I/O request at the block S232, for instance. In one example, the backend may be a HDD.

As shown in FIG. 2b, in one embodiment, the method 200 may further comprise: checking, prior to the block S231 (namely before forwarding the I/O request to the backend), whether the data to be read/written by the I/O request has been cached in the fast cache at the block S233, and forwarding the I/O request to the fast cache to read/write the data and sending a response to the upper layer at the bock S231 if the data to be read/written by the I/O request has been cached in the fast cache; and forwarding the I/O request to the backend at the block S231 only if the data to be read/written by the I/O request has not been cached in the fast cache yet.

Figure 3:
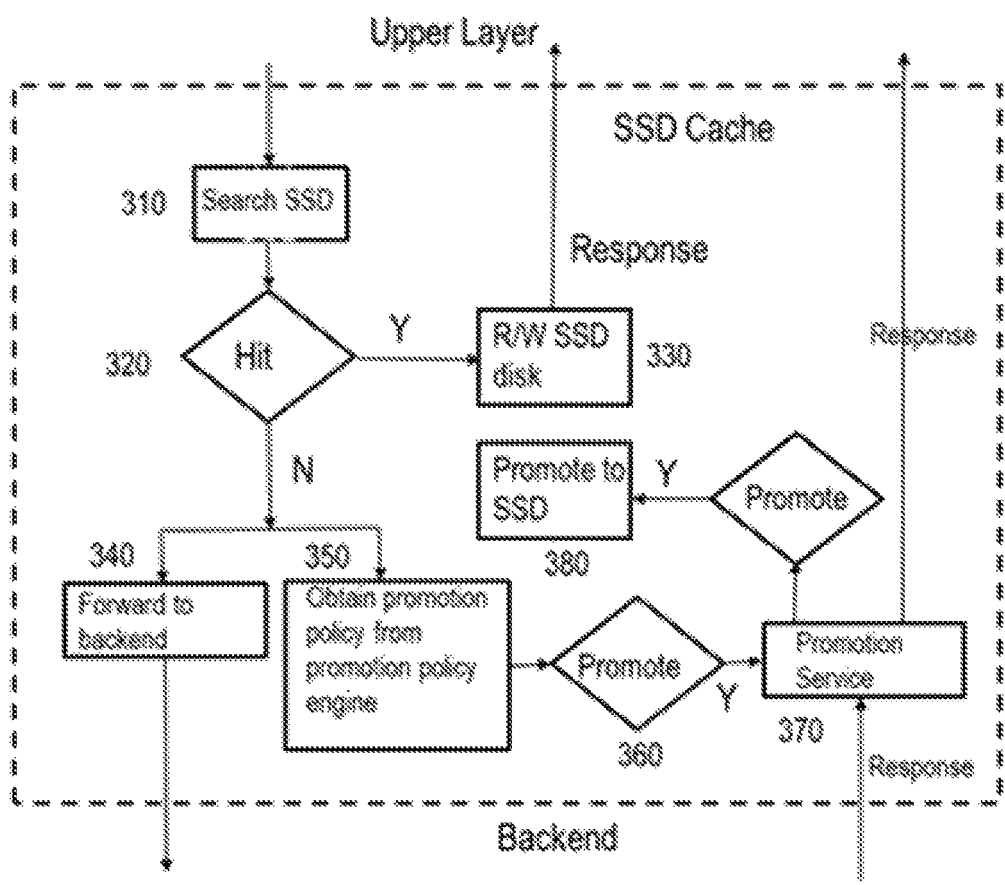
FIG. 3 illustrates a schematic flowchart for executing the I/O processing according to one embodiment of the present disclosure in a SSD cache.

FIG. 3 illustrates a schematic flowchart for executing the I/O processing according to another embodiment of the present disclosure in the SSD cache. The operation in the flowchart may be viewed as one embodiment of the block S230 in FIG. 2a. In the example of FIG. 3, after SSD receives the I/O from the high-layer drive, the SSD cache is sought for at step 310 to check (320) whether the corresponding data has been cached in the SSD disk (i.e., whether it is hit); if the cache is hit, i.e., the corresponding data has been cached in the SSD, the I/O request is forwarded to the SSD disk at step 330 to read/write the SSD disk; if the cache is not hit, the I/O request is forwarded to the backend at the step 340, and the promotion policy for the I/O type of the I/O request (for example, the I/O type determined at the block S220 in FIG. 2) is obtained from the promotion policy engine module at step 350; it is determined based on the I/O type at step 360 whether the read/write data corresponding to the I/O request needs to be promoted to the SSD; in one embodiment, it may be determined at step 360 through the operation in the block S232 whether the corresponding data needs to be promoted. If promotion is determined (for example, if the I/O type is the metadata service), information of the I/O may be updated (for example, the information that the corresponding data needs to be promoted is provided) to the SSD cache promotion service at step 370; therefore, if the I/O request is returned from the backend, the SSD cache promotion service may write the read/write data corresponding to the I/O into the SSD disk at step 380 based on information of the I/O, i.e., the data page corresponding to the I/O request is promoted to the SSD disk.

Figure 4:
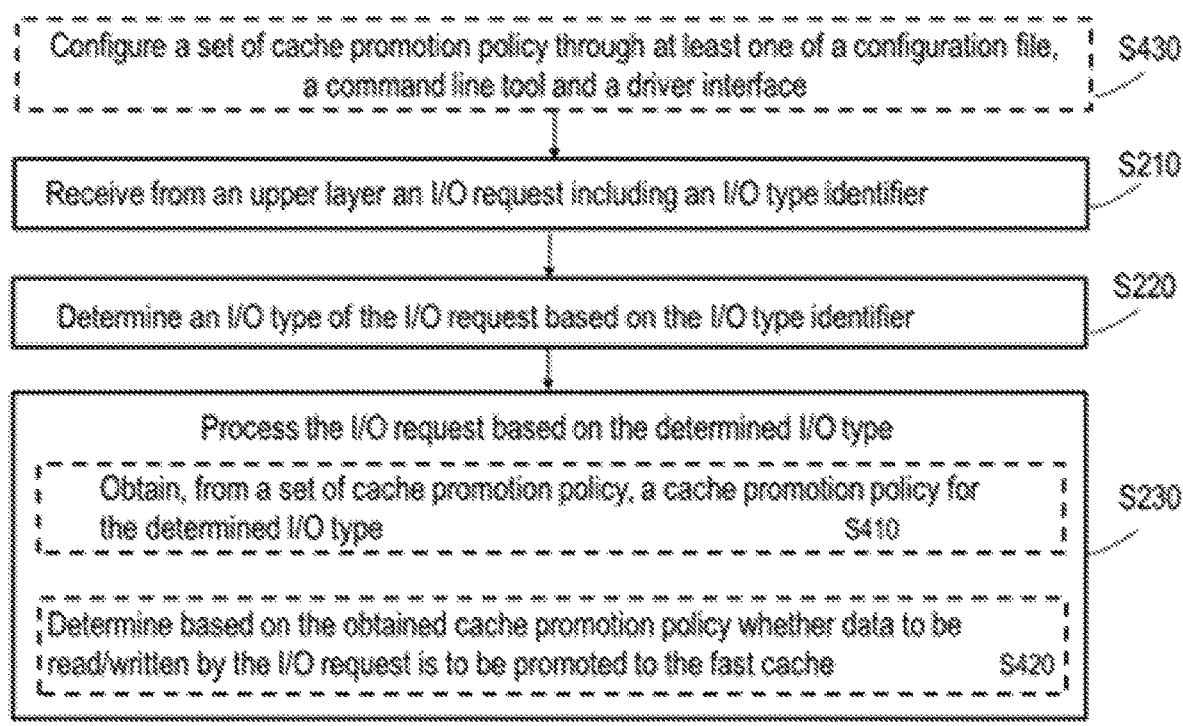
FIG. 4 illustrates a flow chart of another example method for I/O processing in a storage system according to embodiments of the present disclosure.

As described above with reference to FIG. 3, the promotion policy for the particular I/O type may be obtained from the promotion policy engine module. In one embodiment, as shown in FIG. 4, the operation at the block S230 of the method 200 may comprise obtaining (S410) a cache promotion policy for the determined I/O type from the set of cache promotion policies; and determining (S420) based on the obtained cache promotion policy whether the data to be read/written by the I/O request is to be promoted to the fast cache. The set of cache promotion policies may include cache promotion policies for different I/O types. As an example, the set of cache promotion policies may include at least one of the following:

Policy 1: for the metadata I/O, the metadata is promoted to the fast cache if firstly being accessed;

Policy 2: for the user data I/O, the user data is promoted to the fast cache if a number of times for which the user data is accessed exceeds a first promotion threshold;

Policy 3: for the background data I/O, the background data is promoted to the fast cache if a number of times for which the background data is accessed exceeds a second promotion threshold;

Policy 4: for the I/O having a read/write data amount exceeding the predetermined data amount threshold, the read/write data is not to be promoted to the fast cache.

According to the teaching of the present embodiment, those skilled in the art can also obtain other cache promotion policies. For instance, for the metadata, the access time threshold may be set to determine whether promotion is necessary, and the time threshold may be less than the thresholds for the user data and the background data. Hence, it is unnecessary to exhaust all possible cache promotion policies herein.

As an example, if the I/O type is indicated, by a type identifier, as DRAM cache clearing data, which is a type of background data; and the promotion policy for the background data I/O is as described by the above Policy 2, and the second promotion threshold is assumed as twice. In the case, the SSD cache may check whether the I/O has accessed twice within a given period, and if the condition is satisfied, the SSD cache may updatem to its promotion servicem information of the I/O, such as the information that the data of the I/O can be promoted; subsequently, the SSD cache promotion service may write the corresponding data into the SSD (for example, after the data is read from HDD). If the condition is not satisfied, the historical information of the I/O may be updated and it waits until the condition (i.e., it is accessed twice within the given period) is satisfied.

Regarding the I/O not carrying the I/O type identifier or the I/O which cannot be promoted according to its type, the promotion policy engine may, for example, define a universal promotion policy based on the recency and frequency of the I/O in the set of cache promotion policies. For instance, for such I/O, upon receipt of a response from the backend (such as the physical LUN of the HDD), the promotion service may check if data of the I/O needs to be promoted to the SSD based on the universal promotion policy. If it does not need to be promoted, the SSD cache may send a response to the upper layer; and if it needs to be promoted, the corresponding data is written into SSD and, prior or subsequent to this, the response is sent to the upper layer.

Figure 5:
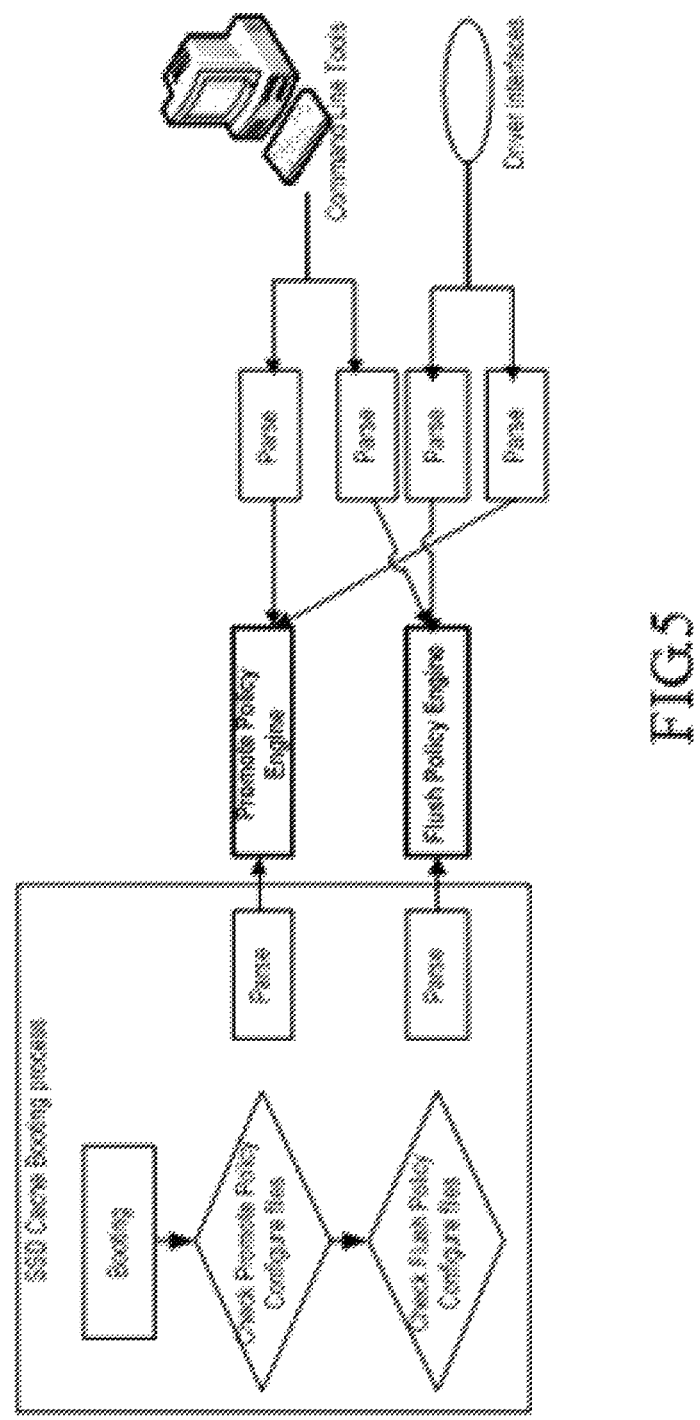
FIG. 5 illustrates a schematic view of multiple manners for configuring cache promotion policy according to embodiments of the present disclosure.

The set of cache promotion policies may be predetermined or may be configured. FIG. 5 illustrates multiple examples for configuring the set of cache promotion policies. As shown in FIG. 5, the configuration may be realized by a configuration file. Specifically, when the SSD cache is started, the promotion policy may be loaded from the configuration file and applied to the promotion policy engine after being parsed. The promotion policy engine may provide/generate/update the set of cache promotion policies. In another example of FIG. 5, the configuration may be realized by a command line tool. For example, the user may input command lines through a command line tool, and the command line tool parses the input and applies the policy to the promotion policy engine. In still another example of FIG. 5, the configuration may be realized by the driver interface. For instance, if the DRAM cache desires to cache its clearing data to the SSD cache, it may configure the SSD promotion policy engine, such that the promotion policy associated with the clearing data of the DRAM cache is provided as follows: being promoted to the SSD cache at the first access. Hence, upon receiving an I/O request of such I/O type, the SSD cache will perform the promotion immediately. Therefore, in one embodiment, the method 200 may further comprise configuring the set of cache promotion policies through at least one of the configuration file, the command line tool and the driver interface (S430), as shown in FIG. 4.

In another one embodiment, the following operations may be included in the block S230 of the method 200: if the read/write data responding to the I/O request has been cached in the fast cache, determining whether the read/write data responding to the I/O request is to be cleared from the fast cache based on the determined I/O type. According to the embodiment, the cache data in the fast cache (such as the SSD cache) is managed according to the I/O type, such that the fast cache is utilized more efficiently.

Figure 6:
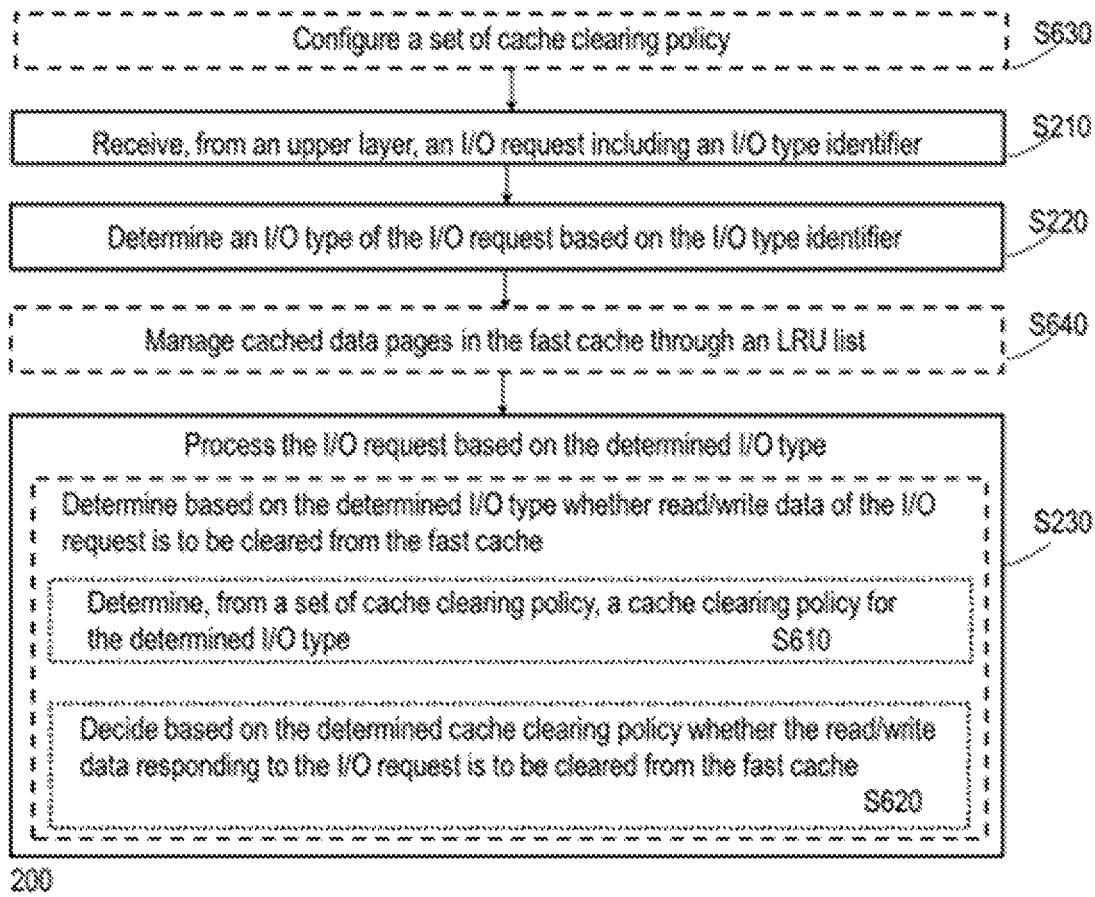
FIG. 6 illustrates a flowchart of still another example method for I/O processing in a storage system according to embodiments of the present disclosure.

FIG. 6 illustrates a flowchart of the operation executed at the block S230 according to one embodiment that determines whether the read/write data responding to the I/O request is to be cleared from the fast cache based on the determined I/O type. As shown in FIG. 6, it comprises determining a cache clearing policy for the determined I/O type from the set of cache clearing policies (S610); and determining whether the read/write data responding to the I/O request is to be cleared from the fast cache based on the determined cache clearing policy (S620).

In one embodiment, the method 200 may further comprise: configuring (S630) the set of cache clearing policies, such that: the metadata is retained in the fast cache without being clearing in a first probability; the user data is retained in the fast cache without being cleared in a second probability less than the first probability; and the background data is retained in the fast cache without being cleared in a third probability not greater than the probability.

The reason for I/Os of different types to have different cache clearing policies is that the small and random I/Os will have a decreased probability to be processed by the HDD if they have higher chances to be retained in the SSD, thereby lessening the impact on the HDD performance and the overall performance of the storage system. Take the metadata and the user data as an example. As the read/write metadata belongs to the small and random I/O, caching the metadata has a higher value than caching user data, and the SSD cache needs to retain the metadata as long as possible. However, the SSD cache also needs a policy for clearing the cache data, because the cached data may become cold and never be accessed again and the clod data clearing is advantageous to improve the efficiency of the fast cache. In one embodiment of the present disclosure, different clearing probabilities can be realized by setting different counters or timers for different I/O types, but the embodiments of the present disclosure are not limited to this.

As shown in FIG. 6, in one embodiment, the method 200 may comprise configuring (S630) the set of cache clearing policies through at least one of the configuration file, the command line tool and the driver interface.

In another one embodiment, the method 200 may comprise managing (S640) the data page cached in the fast cache through the least recently used (LRU) list, wherein the LRU list includes the hottest data pages at the first item and the coldest data pages at the last item. Moreover, in the block S620, whether the read/write data responding to the I/O request is to be cleared from the fast cache is determined in the following manners:

if the determined I/O type is the metadata I/O and if the number of times for which the metadata pages reach the last item of the LRU list exceeds a first clearing threshold, corresponding metadata pages are cleared from the fast cache;

if the determined I/O type is the user data I/O or the background data I/O and if the number of times for which the user data pages or the background data pages reach the last item of the LRU list exceeds a second clearing threshold, the corresponding user data pages or the background data pages are cleared from the fast cache; the second clearing threshold is set to be less than the first clearing threshold, so that the time for retaining the user data and the background data in the fast cache is shorter than that for retaining the metadata.

As appreciated by those skilled in the art, the embodiments of the present disclosure are not restricted to the aforementioned LRU list. For instance, in another one example, the coldest data pages may be listed at the first item of the LRU list and the hottest data pages may be listed at the last item; and the cache clearing policy may be changed correspondingly.

Figure 7A:
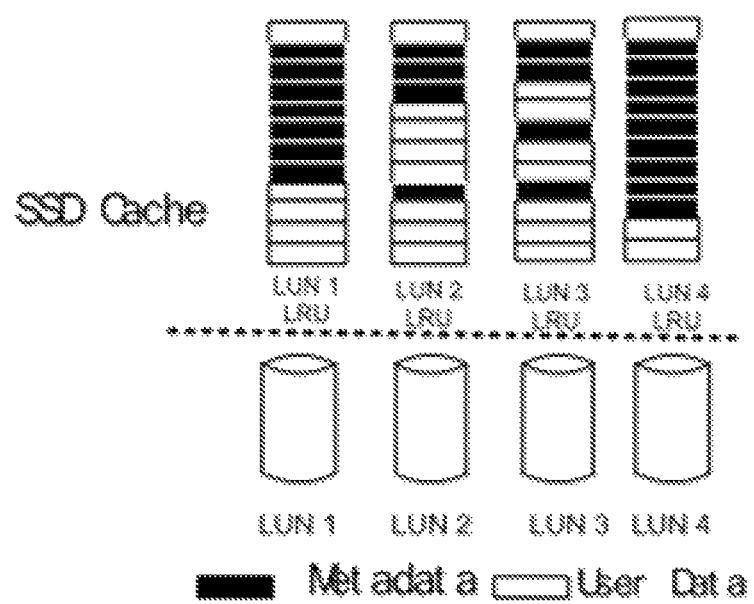
FIGS. 7a-7b illustrates a schematic view of a method for managing and clearing cache data according to embodiments of the present disclosure.

FIG. 7a illustrates an example in which the LRU is used in the SSD cache to perform data page management. In the example, for each LUN, an LRU list is used to manage the cached data. In the figure, the dark block represents the metadata, and the white block represents the user data. Take the LUN 1 as an example, the hottest data pages are listed at the top of the LRU list, and the coldest data pages are listed at the bottom. If the SSD desires to remove one cached data page, it may remove the data pages at the bottom to the HDD (the physical LUN).

Figure 7B:
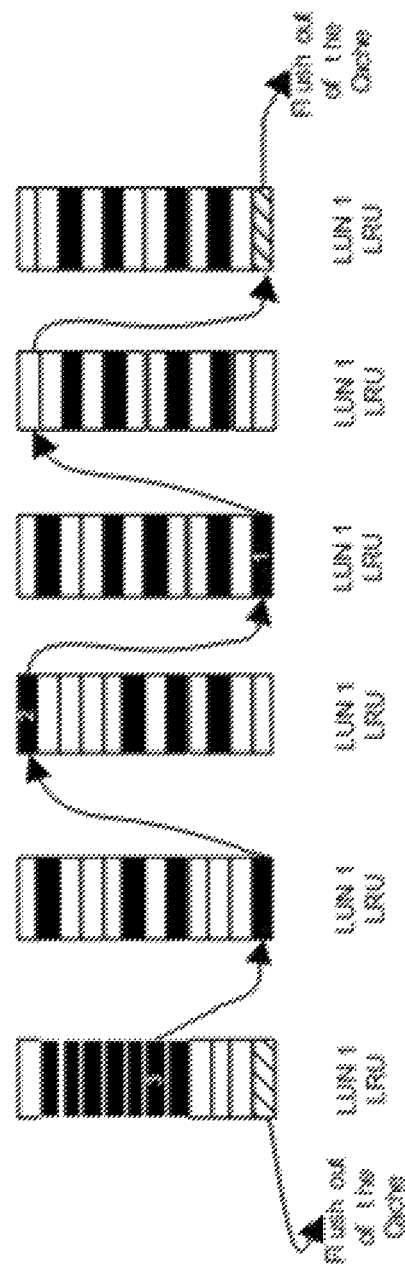

FIG. 7b illustrates a further example in which the LRU is used in the SSD cache to perform data page management. In the example, the SSD may set the first clearing threshold to be 3, i.e., if the metadata reaches the bottom of the LRU list for 3 times, it may be removed from the LRU list and enters the HDD. It should be understood that the first clearing threshold may be other proper numerical values. As shown in FIG. 7b, assuming that the first clearing threshold is 3, a procedure for removing the cached metadata may be described as follows:

if the metadata is promoted to the fast cache, its counter is set to be 3;

if the cached pages of the metadata reach the bottom of the LRU list, its counter is reduced by 1, and the cached pages are moved back to the top of the LRU list;

if the metadata counter reaches 1 and the cached pages are at the bottom of the LRU list, the counter is cleared and the cached pages are moved back to the LRU list;

if the metadata counter is cleared to zero and the metadata cache pages are at the bottom of the LRU list, the metadata cache pages are cleared from the fast cache.

For the user data cache pages, the counter may not be used, or the second clearing threshold is assumed as 1, i.e., if the user data cache pages reach the bottom of the LRU list, they are cleared from the SSD cache. It should be noted that, the second clearing threshold for the user data I/O or the background data I/O may be set as other values which are less than the first clearing threshold.

According to the embodiment of the present disclosure, the time for retaining the metadata in the fast cache is longer than that for retaining the user data and the background data. Meanwhile, if the data actually becomes cold, it is removed from the fast cache (for example, the SSD cache).

Figure 8:
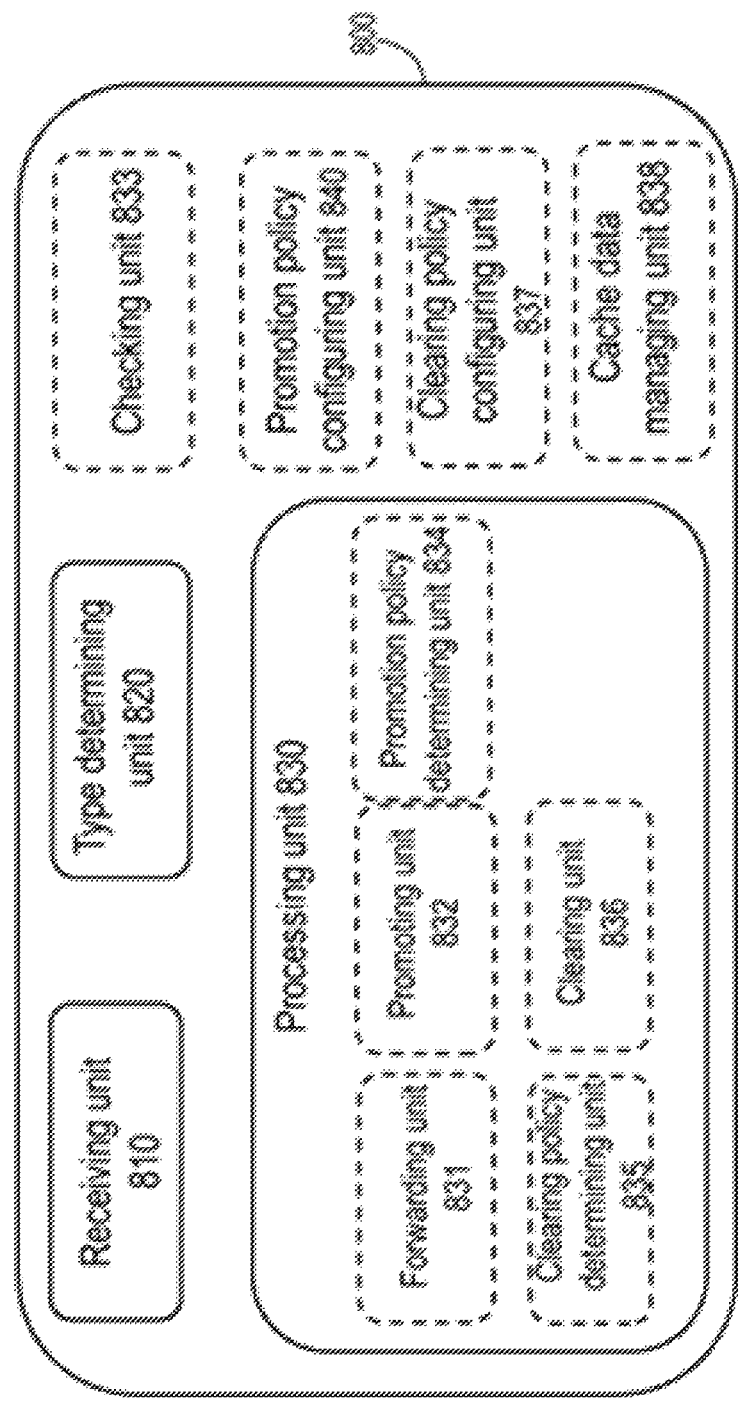
FIG. 8 illustrates a structure diagram of an apparatus for performing I/O processing based on I/O types according to embodiments of the present disclosure.

FIG. 8 illustrates an example structure diagram of an apparatus 800 for performing input/output (I/O) processing in the storage system according to embodiments of the present disclosure. In one embodiment, the apparatus 800 may be implemented as one portion of a fast cache (such as the SSD cache) in the storage system. In another one embodiment, the apparatus 800 may be implemented as an apparatus separated from the fast cache, which may communicate with the fast cache. The apparatus 800 is operable to perform the method 200 described with reference to FIGS. 2a-7b and any other processing and methods. It should be understood that the method 200 is not limited to be performed by the apparatus 800, and at least some blocks of the method 200 may be performed by other apparatuses or entities.

As shown in FIG. 8, the apparatus 800 comprises: a receiving unit 810 configured to receive an I/O request from the upper layer, wherein the I/O request comprises an I/O type identifier; a type determining unit 820 configured to determine the I/O type of the I/O request based on the I/O type identifier; and a processing unit 830 configured to process the I/O request based on the determined I/O type.

As the apparatus 800 is operable to perform the method 200 as described with reference to FIGS. 2a-7b, therefore, descriptions with respect to the I/O type, the determination of the I/O type, and the processing of the I/O request based on the determined I/O type performed in the method 200 and FIGS. 2a-7b are also applicable here, and will not be repeated.

For example, the receiving unit 810, the type determining unit 820 and the processing unit 830 in the apparatus 800 may be respectively configured to perform operations in the blocks S210, S220, S230.

In another one embodiment, the processing unit 830 may further comprise: a forwarding unit 831 configured to forward the I/O request to the backend to read/write the data; and a promote unit 832 configured to send a response to the upper layer if the I/O request is returned from the backend, and to determine based on the determined I/O type whether the read/write data responding to the I/O request is to be promoted to the fast cache. In some embodiments, the forwarding unit 831 and the promoting unit 832 may be configured to respectively perform the operations in the blocks S231 and S232 as described with reference to FIG. 2b.

In a further embodiment, the apparatus 800 may comprise a checking unit 833 configured to check whether the data to be read/written by the I/O request has been cached in the fast cache prior to the I/O request being forwarded to the backend. Correspondingly, the forwarding unit 831 may be configured to forward the I/O to the fast cache or the backend based on a result of the checking.

In one embodiment, the processing unit 830 of the apparatus 800 may further comprise a promotion policy determining unit 834 configured to obtain the cache promotion policy for the determined I/O type from the set of cache promotion policies; and a promoting unit 832 configured to determine whether the data to be read/written by the I/O request is to be promoted to the fast cache based on the obtained cache promotion policy. The promotion policy determining unit 834 and the promoting unit 832 may be configured to respectively perform the operations in the S410 and S420 as illustrated with reference to FIG. 4. In another embodiment, the apparatus 800 may comprise a promotion policy configuring unit 840 configured to configure the set of cache promotion policies through at least one of a configuration file, a command line tool and a driver interface.

In the above embodiments, the apparatus 800 reduces the probability of processing some I/Os (such as small and random I/Os) by the backend by selectively promotes the data to the fast cache to cache it therein based on the I/O type, thereby lessening the impact on the backend (such as HDD) performance.

In some other embodiments, alternatively or additionally, the processing unit 830 of the apparatus 800 may determine based on the determined I/O type whether the read/write data responding to the I/O request is to be cleared from the fast cache if the read/write data of the I/O request has been cached in the fast cache, so as to clear the unnecessary data in the fast cache and improve the efficiency of the fast cache.

In one example embodiment, the processing unit 830 may further comprise a clearing policy determining unit 835 configured to determine a cache clearing policy for the determined I/O type from a set of cache clearing policies; and a clearing unit 836 configured to determine based on the determined cache clearing policy whether the read/write data responding to the I/O request is to be cleared from the fast cache. In another one embodiment, the processing unit 830 may further comprise a clearing policy configuring unit 837 configured to configure the set of cache clearing policies. In one embodiment, the clearing policy determining unit 835, the clearing unit 836 and the clearing policy configuring unit 837 may be respectively configured to perform the operations in the blocks S610, S620 and 630 as described with reference to FIG. 6. Therefore, the details are omitted herein.

In one further embodiment, the apparatus 800 may further comprise a cache data managing unit 838 configured to manage cached data pages cached in the fast cache through the least recently used (LRU) list, wherein hottest data pages are listed at a first item of the LRU list and coldest data pages are listed at the last item. Correspondingly, the clearing unit 836 may be configured to determine whether the data is cleared from the fast cache based on the I/O type (including, for example, the threshold dedicated to an I/O type, the location of the data in the LRU list). As the specific examples have been described with reference to FIGS. 6-7b, details are omitted herein.

As appreciated by those skilled in the art, the apparatus 800 may further comprise other units not shown in FIG. 8, for example, a unit for fast caching.

The advantages of the method and the apparatus according to the embodiments of the present disclosure include at least one of the following:
- caching more metadata in the fast cache, thereby reducing the small and random I/Os entering into the HDD;
- improving overall performance of the storage system;
- shortening user responding time, and improving I/OPS;

effectively managing the fast cache and improving utilization efficiency of the fast cache.

Those skilled in the art would readily realize that blocks or steps in the aforementioned various methods may be executed by a programmed computer. In the present disclosure, some embodiments also intend to cover the program storage device, for example, a digital data storage medium which is a machine or computer readable and coding-machine executable or computer executable instruction program, wherein the instruction executes some or all steps of the above mentioned method. A program storing device may be, for example, a digital memory such as a disk and a magnetic storage medium of a magnetic tape, a disk drive or an optical readable digital data storage medium. The present embodiment also intends to cover a computer programmed to execute steps of the method.

The functions of various elements of the apparatus as shown in figures may be provided by use of software, dedicated hardware and hardware associated with software and capable of executing software, or firmware, or combination thereof. In one embodiment, an apparatus is provided, and the apparatus comprises a processor and a memory including an instruction, and the apparatus is operable to implement any method illustrated in FIGS. 2a-7b when the instruction is executed by the processor. The function of the processor may be provided by a single dedicated processor, by a single shared processor or a plurality of separate processors. Moreover, the term "processor" may include but not limited to digital signal processor (DSP) hardware, a network processor, an Application Specific Integrated Circuit (ASIC), a field programmable gate array (FPGA), a read-only memory (ROM) for storing software, a random access memory (RAM) and a non-volatile storage device. It may also comprise other regular and/or customized hardware.

In one embodiment of the present disclosure, a fast cache (for example, the SSD cache) in the storage system is also provided, comprising any one apparatus described with reference to FIG. 8.

It should be appreciated by those skilled in the art that the specification and figures are only used to explain principles of the present disclosure. Therefore, it should be understood that those skilled in the art would design various arrangements, though not explicitly described or shown herein, the arrangements embodies the principles of the present disclosure and are included in the spirit and scope of the present disclosure. Moreover, all the examples expounded herein are mainly used for the teaching purpose to aid readers in understanding the principles of the present disclosure and the concepts contributed by the inventor and to advance the present field, and it should be construed as not being restricted to the specifically expounded examples and conditions. Besides, all the illustration and the specific embodiments of the principles, aspects and embodiments of the present disclosure also intend to cover the counterparts thereof.

What is claimed is:

1. A method for input/output (I/O) processing in a storage system, comprising:
    receiving, at a fast cache, an I/O request from an upper layer, the I/O request including an I/O type identifier;
    determining an I/O type of the I/O request based on the I/O type identifier;
    applying a promotion policy to the I/O request based on the I/O type to determine whether to promote to the fast cache read/write data responding to the I/O request; and
    processing the I/O request based on the determined I/O type, wherein the receiving, determining, applying, and processing occur at the fast cache;
    managing data pages cached in the fast cache through a least recently used (LRU) list, the LRU list including hottest data pages at a first item and coldest data pages at a last item; and
    if the determined I/O type is a metadata I/O and if a number of times for which metadata pages reach the last item of the LRU list exceeds a first clearing threshold, clearing corresponding metadata pages from the fast cache.

2. The method according to claim 1, wherein determining an I/O type of the I/O request based on the I/O type identifier comprises:
    determining an I/O type from a predetermined set of I/O types based on the I/O type identifier;
    the predetermined set of I/O types including a first I/O type and a second I/O type, and
    the storage system including a first storage device adapted to fast cache data of an I/O of the first I/O type and a second storage device adapted to fast cache data of an I/O of the second I/O type.

3. The method according to claim 2, wherein the first I/O type includes a random I/O and the second I/O type includes a continuous I/O.

4. The method according to claim 2, wherein the first I/O type includes a metadata I/O and the second I/O type includes a user data I/O and/or a background data I/O.

5. The method according to claim 2, wherein the first storage device includes the fast cache and the second storage device includes a hard drive (HDD).

6. The method according to claim 1, wherein processing the I/O request based on the determined I/O type comprising:
    forwarding the I/O request to a backend for reading or writing data;
    sending a response to the upper layer if the I/O request is returned from the backend; and
    determining, based on the determined I/O type, whether the read/write data responding to the I/O request is to be promoted to the fast cache.

7. The method according to claim 6, wherein determining, based on the determined I/O type, whether the read/write data responding to the I/O request is to be promoted to the fast cache comprises:
    if the determined I/O type is a random I/O or a metadata I/O, promoting the read/write data responding to the I/O request to the fast cache.

8. The method according to claim 6, wherein determining, based on the determined I/O type, whether the read/write data responding to the I/O request is to be promoted to the fast cache comprises:
    if the determined I/O type is a continuous I/O, a user data I/O or a background data I/O, determining whether the read/write data responding to the I/O request is to be promoted to the fast cache further based on a recency and/or a frequency of the I/O request.

9. The method according to claim 6, further comprising:
    prior to forwarding the I/O request to the backend, checking whether data to be read/written by the I/O request has been cached in the fast cache;
    if the data to be read/written by the I/O request has been cached in the fast cache,
        forwarding the I/O request to the fast cache to read/write data and
        sending a request to the upper layer; and if the data to be read/written by the I/O request has not been cached in the fast cache, forwarding the I/O request to the backend only.

10. The method according to claim 1, wherein the upper layer is a dynamic random access memory (DRAM) drive or a virtual logic unit number (LUN) drive.

11. The method according to claim 1, wherein processing the I/O request based on the determined I/O type comprises:
obtaining, from a set of cache promotion policies, a cache promotion policy for the determined I/O type; and
determining based on the obtained cache promotion policy whether data to be read/written by the I/O request is to be promoted to the fast cache.

12. The method according to claim 11, wherein the set of cache promotion policies includes at least one of the following:
for a metadata I/O, metadata is promoted to the fast cache if the metadata is accessed for a first time;
for a user data I/O, user data is promoted to the fast cache if a number of times for which the user data is accessed exceeds a first promotion threshold;
for a background data I/O, background data is promoted to the fast cache if a number of times for which the background data is accessed exceeds a second promotion threshold;
for an I/O having a read/write data amount exceeding a predetermined data amount threshold, read/write data is not to be promoted to the fast cache.

13. The method according to claim 11, further comprising:
configuring the set of cache promotion policies through at least one of a configuration file, a command line tool and a driver interface.

14. The method according to claim 1, wherein processing the I/O request based on the determined I/O type comprises:
if the read/write data responding to the I/O request has been cached in the fast cache, determining based on the determined I/O type whether the read/write data responding to the I/O request is to be cleared from the fast cache.

15. The method according to claim 14, wherein determining based on the determined I/O type whether the read/write data responding to the I/O request is to be cleared from the fast cache comprises:
determining, from a set of cache clearing policies, a cache clearing policy for the determined I/O type; and
determining based on the determined cache clearing policy whether the read/write data responding to the I/O request is to be cleared from the fast cache.

16. The method according to claim 15, further comprising:
configuring the set of cache clearing policies, such that:
metadata is retained in the fast cache without being cleared in a first probability;
user data is retained in the fast cache without being cleared in a second probability less than the first probability; and
background data is retained in the fast cache without being cleared in a third probability not greater than the second probability.

17. The method according to claim 15, further comprising:
configuring the set of cache clearing policies through at least one of a configuration file, a command line tool and a driver interface.

18. The method according to claim 15, further comprises: and wherein determining, based on the determined I/O type, whether the read/write data responding to the I/O request is to be cleared from the fast cache comprising: and if the determined I/O type is a user data I/O or a background data I/O and if a number of times for which user data pages or background data pages reach the last item of the LRU list exceeds a second clearing threshold, clearing corresponding user data pages or background data pages from the fast cache, the second clearing threshold being less than the first clearing threshold.

19. An apparatus for input/output (I/O) processing in a storage system, comprising:
a receiving unit configured to receive, at a fast cache, an I/O request from an upper layer, the I/O request including an I/O type identifier;
a type determining unit configured to determine an I/O type of the I/O request based on the I/O type identifier;
a promotion policy engine to provide a promotion policy applied to the I/O request based on the I/O type to determine whether to promote to the fast cache read/write data responding to the I/O request; and
a processing unit configured to process the I/O request based on the determined I/O type, wherein the receiving, determining, applying, and processing occur at the fast cache, the processing unit managing data pages cached in the fast cache through a least recently used (LRU) list, the LRU list including hottest data pages at a first item and coldest data pages at a last item; and
if the determined I/O type is a metadata I/O and if a number of times for which metadata pages reach the last item of the LRU list exceeds a first clearing threshold, the processing unit clearing corresponding metadata pages from the fast cache.

20. The apparatus according to claim 19, wherein the type determining unit is configured to:
determine a first I/O type from a predetermined set of I/O types based on the I/O type identifier;
the predetermined set of I/O types including a first I/O type and a second I/O type; and
wherein the storage system including a first storage device adapted to fast cache data of the I/O of the first I/O type and a second storage device adapted to store data of the I/O of the second I/O type.

* * * * *